3 Sheets—Sheet 1.

R. HOLGATE.
Gang Plow.

No. 229,822.        Patented July 13, 1880.

Witnesses
M. H. Barringer.
C. R. Richards.

Inventor:
R. Holgate,
By W. D. Richards,
Atty.

3 Sheets—Sheet 2.

R. HOLGATE.
Gang Plow.

No. 229,822.  Patented July 13, 1880.

Witnesses:
M. H. Bassinger.
S. R. Richards.

Inventor:
R. Holgate,
By W. B. Richards,
atty.

3 Sheets—Sheet 3.
R. HOLGATE.
Gang Plow.
No. 229,822. Patented July 13, 1880.
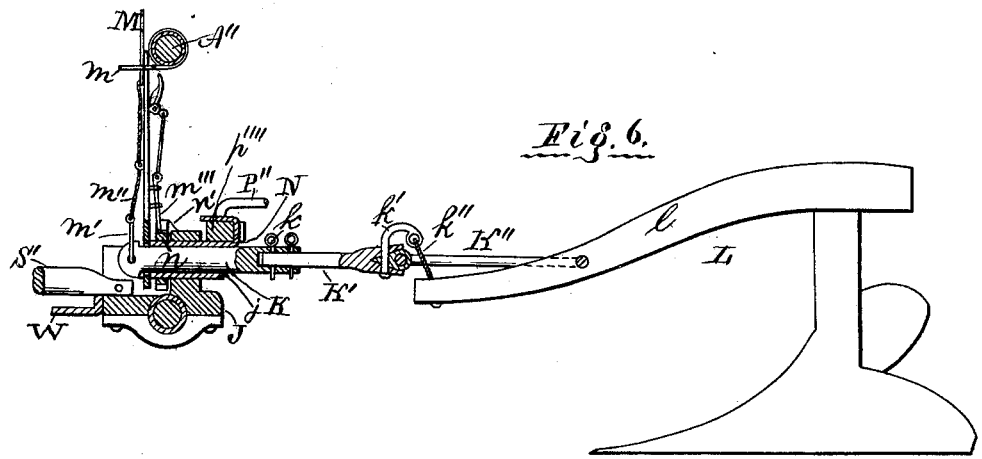
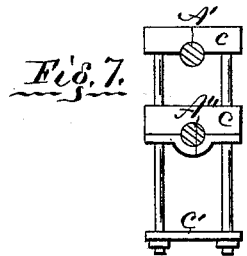
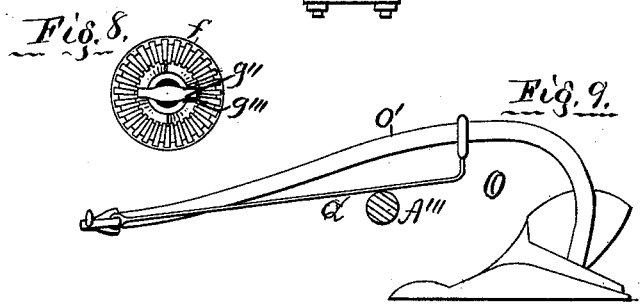
Witnesses:
M. H. Barringer.
S. R. Richards.
Inventor:
R. Holgate,
By W. B. Richards,
Atty.

UNITED STATES PATENT OFFICE.

REUBEN HOLGATE, OF NEPONSET, ILLINOIS.

GANG-PLOW.

SPECIFICATION forming part of Letters Patent No. 229,822, dated July 13, 1880.

Application filed August 16, 1879.

*To all whom it may concern:*

Be it known that I, REUBEN HOLGATE, of Neponset, in the county of Bureau and State of Illinois, have invented certain new and useful Improvements in Gang-Plows; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1:
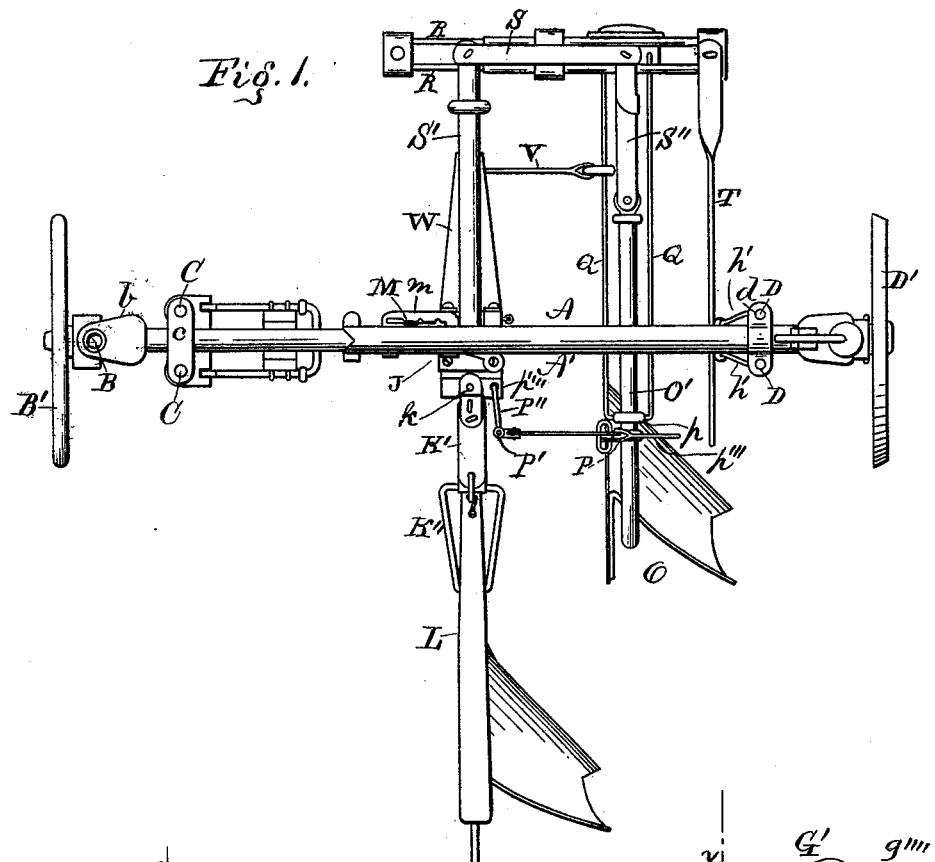
Figure 2:
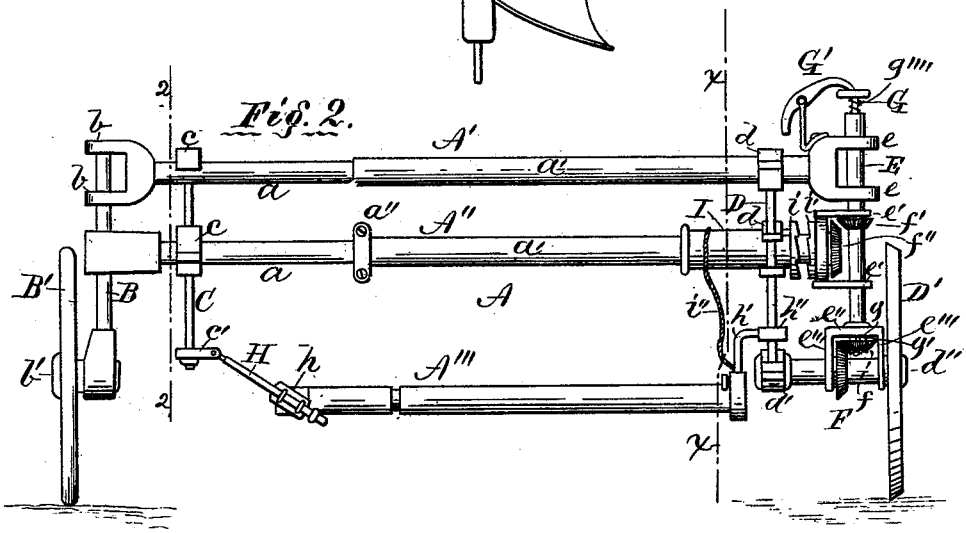
Figure 3:
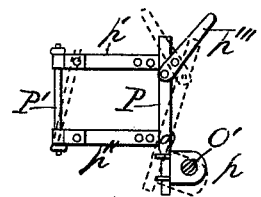
Figure 4:
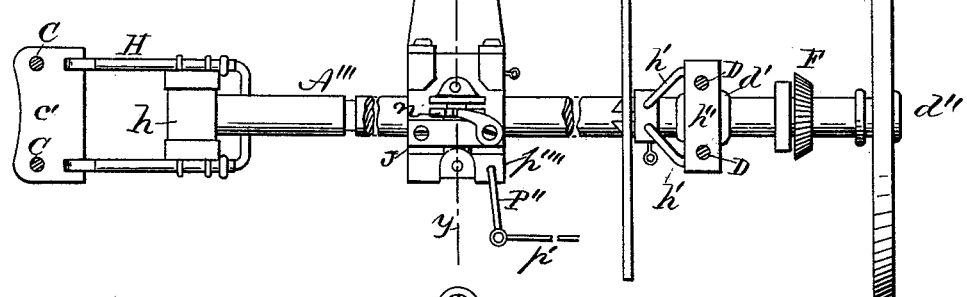
Figure 5:
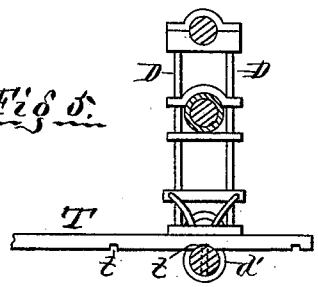

Figure 1 is a top view of a plow embodying my invention. Fig. 2 is a rear elevation of the axle or wheel frame. Fig. 3 is a rear elevation of the flexible frame connecting the rear ends of the plow-beams. Fig. 4 is an enlarged top-plan view of the lower bar of the wheel-frame and the adjacent parts of the plows. Fig. 5 is a sectional view in the line $x$ $x$ in Fig. 2. Fig. 6 is an enlarged vertical sectional view in the line $y$ $y$ in Fig. 4. Fig. 7 is a sectional view in the line 2 2 in Fig. 2. Fig. 8 is an enlarged detail view, hereinafter referred to. Fig. 9 illustrates a bearing for a plow.

This invention relates to gang-plows; and it consists in the construction and combination of parts, hereinafter described, and set forth in the claims hereto annexed.

Referring to the drawings by letters, A represents the wheel frame or axle, formed of two horizontal bars, A' A", each consisting of a bar, $a$, at one end, with a bar, $a'$, at the other, which bars $a'$ telescope or fit over the bar $a$, so as to permit adjusting the length of the bars A' A". The bars $a$ and $a'$ may be held at different adjustments by a clamp, $a''$. One end of the bars A' A" support, by suitable attachments $b$, a vertical bar, B, to the lower end of which a spindle, $b'$, is attached, on which a supporting-wheel, B', is journaled.

C C are vertical bars, secured one in front and one in rear of the bars A' A", near one end of said bars, by suitable blocks $c$. The ends of the bars C extend below the bar A" and pass through a plate, $c'$, which can be moved freely up and down on the bar C. Near the other end of the bars A' A" vertical bars D D are secured by blocks $d$, and carry at their lower pendent ends blocks $d'$, which form a bearing for the inner end of a spindle, $d''$, on the outer end of which a supporting-wheel, D', is fixed, so that the spindle $d''$ rotates with said wheel.

The bar A' has bearings $e$ $e$, and the bar A" bearings $e'$ $e'$, in which a vertical tubular shaft, E, is carried, to the lower end of which is attached a head, $e''$, with arms $e'''$, which form bearing-supports for the outer end of the shaft $d''$. The shaft $d''$ has a pinion, F, gearing with a pinion, $f$, on the shaft E, and the shaft E has another pinion, $f'$, gearing with a pinion, $f''$, on the tubular end $a'$ of the bar A".

G is a rod passing downward through the hollow shaft E, and is held from rotating therein by a pin, $g$, which passes out through a slot, $g'$, in the shaft E, and prevents rotation of the rod G, but allows it to move up and down in the shaft E. The pinion $f$ is loosely fixed on the shaft E, and is constantly in gear with the pinion F, and is held in gear with the shaft E by a lug, $g''$, which projects from the lower end of the rod G, (see Fig. 8 of the drawings, which is a bottom-plan view of pinion $f$,) and is held in contact with a notch, $g'''$, in the lower side of the pinion $f$ by a spring, $g''''$.

To throw the pinion $f$ out of gear with the shaft E, the rod G may be pressed downward with a hand-lever, G', and thus release the lug $g''$ from the notched pinion $f$ and allow said pinion to rotate without rotating the shaft E.

A'" is a bar, adjustable in length by same construction as the bars A' A". One end of the bar A'" is hinged by a head, $h$, to a yoke, H, which, in turn, is hinged at one end to the plate $c'$, so that the yoke H may oscillate in a vertical plane, and thus allow the adjacent end of the bar A'" to rise and fall, and the plate $c'$ may slide up and down on the bars C for the same purpose. The other end of the bar A'" is connected by arms $h'$ with a head, $h''$, which is free to rise and fall on the arms D, which pass through it, for the purpose of allowing that end of the bar A'" to rise and fall as required. The plow-beams rest upon the bar A'", as hereinafter described, and when desired to raise the bar A'", to raise the plow-beams when the plow is in operation, the draft-animals may be made to raise it as follows:

A sleeve, I, fits loosely on the end $a'$ of the bar $A''$, and has a clutch, $i$, which may be engaged with a clutch, $i'$, on the end $a'$ of the bar $A''$ by any suitable lever or otherwise, and thus cause the sleeve I to be rotated with the end $a'$ of the bar $A''$, which end $a'$ is rotated by the pinion $f''$ and its gear-connection with the shaft E. A cord, $i''$, extends from the sleeve I to the bar $A'''$, so that rotation of the sleeve I may be made to raise the bar $A'''$ as high as desired, when, by releasing the clutches, the further elevation of the bar $A'''$ will be stopped.

J is a block secured to the bar $A'''$, and has a bearing, $j$, through which a horizontal shaft, K, passes, to the rear end of which the plow L is secured as follows: The rear end of the shaft K is forked, and receives the forward end of a plate, $K'$, which is hinged thereto by a bolt, $k$, so that the plate $K'$ may be oscillated in a horizontal plane. To the rear end of the plate $K'$ a yoke, $K''$, is hinged, so that said yoke can be oscillated in a vertical plane. The rear end of the yoke $K''$ passes through the beam $l$ of the plow L, back some distance from the forward end of said plow-beam. A standard, $k'$, projects upward from the rear end of the plate $K'$, and a cord, $k''$, connects the end of the standard $k'$ and the forward end of the plow-beam, and may be shortened or lengthened to regulate the depth of penetration of the plow L.

M is a lever, the lower end of which is loosely seated on the forward end of the shaft K, and the upper end of which passes through a notched bar, $m$, carried on the bar $A''$, so as to permit the lever M to rise and fall with the bar $A'''$. A bolt, $m'$, projects upwardly from the forward end of the shaft K, and is provided with a cord, $m''$, by means of which it may be secured to the lever M, so that when the lever is locked in one of the notches in the bar $m$ the shaft K will be held so as to have but a slight oscillation on its axis, and thus hold the plow L firm as against any more than a desirable freedom of lateral vibration.

N is a short sleeve on the shaft K, and carries at its front end a notched disk, $n$, with which a spring-pawl, $m'''$, on the lever M may be engaged, so as to rotate the sleeve N or hold it stationary by means of the lever M.

$n'$ is a detent projecting from the block J, and may be used to lock the sleeve N and hold it while the shaft K is oscillated or fixed as desired by the lever M.

The object and purposes of the sleeve N will be hereinafter explained.

O is also a plow, to the beam $O'$ of which are rigidly secured blocks $p$, from which projects an upright standard, P, to which are hinged horizontal bars $p'\ p''$, the one $p'$ being indirectly hinged thereto by being hinged to a lever, $p'''$, which lever is hinged to the standard P. The other ends of the bars $p'\ p''$ are hinged to a vertical standard, $P'$, the lower end of which is hinged to a link, $P''$, which extends to and is hinged to a block, $p''''$, which is rigidly attached to the sleeve N.

It will be seen by the dotted lines at Fig. 3 that as the standard P is inclined in either direction it will incline the standard $P'$ in the same direction. Hence the frame shown at Fig. 3 not only tends to hold the plow O in an upright working position, but the link $P''$ permits the plows to be brought nearer to or farther from each other, and in turning around at the ends of "lands" permits the plows to come very near together, and thus enables the plowman to turn the team and plows without raising the plows out of the ground.

By connecting the detent $n'$ with the disk $n$ the sleeve N may be locked and the plow O be held in an upright position, and by releasing the detent $n'$ from the disk $n$ and connecting the pawl $m'''$ with the disk $n$ the plow O may be controlled against wabbling, or given any inclination desired by the lever M, as the disk $n$ is attached to the sleeve N and the sleeve N carries the block $p''''$, to which the link $P''$ is connected, so that inclining the block $p''''$ will incline the standards P $P'$, and thereby incline the plow O. When the disk $n$ is free the plow O may be inclined, as desired, by means of the lever $p'''$.

The plow-beam $O'$ is above the bar $A'''$, and rests thereon to regulate the depth of penetration, and as plow-beams are generally curved, sliding forward and back on the bar $A'''$ would vary the depth of plowing, to prevent which I attach straight rods Q, one to each side of and slightly below the beam $O'$, as shown at Figs. 1 and 9 of the drawings, which rods Q rest on the bar $A'''$.

The draft device is as follows: R R are parallel bars, to the central part of which an equalizer-bar, S, is pivoted. To one end of the bar S the forward end of a draft-bar, $S'$, is hinged, the rear end of which is hinged to the block J, so as to permit the bar $S'$ to be moved both vertically and laterally at its front end. The other end of the bar S is connected with the beam $O'$ of the plow O by a draft-bar, $S''$, which is also free to move laterally and vertically, so that the bars R and equalizer S may be raised and lowered or moved to either side, as required, in turning the team and plows at the ends of furrows. After the team and plows are turned at the end of the furrow, the bar T, which is connected at its forward end with the ends of the bars R, and has notches $t$ at its rear end, may be engaged, by means of its notches $t$, with one end of the bar $A'''$, when it will hold the bars R at right angles with the plow-beams and facilitate steadiness of the plows in line.

The draft-animals, if four are used, may be hitched at the pivot-point of the bars S, and the draft regulated as hereinbefore described; but if three horses are used, a three-horse double-tree arrangement can be used, by which the draft-animals are connected with both ends of the bars R, and in that case the bar T may be entirely dispensed with.

The beam O' is retained at proper distance at its forward end from the bar S' by a rod, V, which extends from the beam O' to a standard, W, which projects forward from the bar A'''.

What I claim as my invention is—

1. In combination with a telescopic axle, A' A'', and plows, a telescopic bar, A''', adapted to be raised and lowered to allow the plows to rise and lower and to adjust their depth of plowing, as and for the purpose specified.

2. In combination with the telescopic bars A' A'' and the plows, the bar A''', adjustably secured to the bars A' A'' by yoke H and sliding plate $c'$, substantially as and for the purpose specified.

3. In combination with the bars A' A'' and adjustable bar A''', the hollow shaft E, having pinions $f f'$, end $a'$ of the bar A'', having pinion $f''$, substantially as and for the purpose specified.

4. The clutched sleeve I and cord $i''$, in combination with the clutched end $a'$ of the bar A'', and with pinion $f''$, and shaft E, having pinions $f f'$, and shaft $d''$, having pinion F, substantially as described, and for the purpose specified.

5. In combination with the hinged bars P P' $p' p''$, fixed block $p''''$, and plows L and O, the link P'', substantially as and for the purpose specified.

6. In combination with a plate, K', hinged to the shaft K, the yoke K'' and beam $l$, connected substantially as and for the purpose specified.

7. In combination with the shaft K, yoke K'', beam $l$, and plate K', the standard $k'$ and cord $k''$, for adjusting depth of plowing, substantially as and for the purpose specified.

8. The lever M, bolt $m'$, and cord $m''$, in combination with the bar A''', block J, and shaft K, to which the plow L is attached, substantially as and for the purpose specified.

9. The lever M and pawl $m'''$, in combination with the sleeve N, having notched disk $n$, and with the shaft K, substantially as and for the purpose specified.

10. The detent $n'$, in combination with the sleeve N, notched disk $n$, pawl-lever M, block $p''''$, link P'', bars P P' $p' p''$, and plow O, as and for the purpose described.

11. The draft-bars S' S'', hinged to the block J and plow-beam O', respectively, in combination with plows L O, bars R, and equalizer-bar S, substantially as and for the purpose specified.

12. The rods Q, in combination with plow-beam O' and adjustable bar A''' of a gang-plow, as and for the purpose specified.

13. In a gang-plow, oscillating draft-bars S' S'', in combination with a draft-bar, S, and with a plow, L, fixed to the wheel-frame, and a plow, O, connected with the plow L, substantially as and for the purpose specified.

14. In a gang-plow, a plow, L, hinged to the axle or wheel frame, and a plow, O, connected with the plow L by hinged connections P P' $p' p''$, so as to permit the plows to approach each other in turning at the ends of furrows, substantially as and for the purpose specified.

In testimony that I claim the foregoing as my own I affix my signature in presence of two witnesses.

REUBEN HOLGATE.

Witnesses:
 THOMAS McKEE,
 P. R. RICHARDS.